(12) United States Patent
Green

(10) Patent No.: US 7,109,665 B2
(45) Date of Patent: Sep. 19, 2006

(54) THREE-WAY DIMMING CFL BALLAST

(75) Inventor: Peter Green, Redondo Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/455,589

(22) Filed: Jun. 4, 2003

(65) Prior Publication Data

US 2004/0032222 A1 Feb. 19, 2004

Related U.S. Application Data

(60) Provisional application No. 60/386,344, filed on Jun. 5, 2002.

(51) Int. Cl.
*H05B 37/02* (2006.01)

(52) U.S. Cl. .................. 315/224; 315/308; 315/299; 315/DIG. 4

(58) Field of Classification Search ........... 315/291, 315/209 R, 200 R, 208, 362, DIG. 4, DIG. 5, 315/244, 82, 247, 307–308, DIG. 7, 219, 315/224–226, 283, 299
See application file for complete search history.

(56) References Cited

U.S. PATENT DOCUMENTS

| | | | |
|---|---|---|---|
| 4,284,925 A | 8/1981 | Bessone et al. ............ 315/240 |
| 4,358,710 A | 11/1982 | Magai ......................... 315/101 |
| 4,535,399 A * | 8/1985 | Szepesi ........................ 363/41 |
| 5,055,993 A | 10/1991 | Miyata et al. .............. 315/219 |
| 5,204,587 A * | 4/1993 | Mortimer et al. .......... 315/308 |
| 5,365,152 A * | 11/1994 | Ozawa et al. .............. 315/291 |
| 5,382,881 A * | 1/1995 | Farkas et al. ............... 315/307 |
| 5,422,545 A | 6/1995 | Felper et al. ............... 315/224 |
| 5,583,402 A * | 12/1996 | Moisin et al. .............. 315/307 |
| 5,640,313 A | 6/1997 | Takehara et al. ............ 363/97 |
| 5,677,602 A * | 10/1997 | Paul et al. ................... 315/224 |
| 5,719,471 A * | 2/1998 | Kachmarik .............. 315/209 R |
| 5,798,620 A | 8/1998 | Wacyk et al. ............... 315/307 |
| 5,818,709 A | 10/1998 | Takehara ..................... 363/95 |
| 5,850,127 A | 12/1998 | Zhu et al. ................... 315/307 |
| 5,914,572 A * | 6/1999 | Qian et al. .................. 315/307 |
| 5,936,357 A * | 8/1999 | Crouse et al. .............. 315/247 |

(Continued)

FOREIGN PATENT DOCUMENTS

| | | |
|---|---|---|
| JP | 59-126499 | 8/1984 |
| JP | 7-45389 | 2/1995 |
| JP | 2001-313196 | 11/2001 |

OTHER PUBLICATIONS

Dimming Procedure of Discharge Lamp, IBM Technical Disclosure Bulletin, Feb. 1996, pp. 143-146.

(Continued)

*Primary Examiner*—Thuy V. Tran
*Assistant Examiner*—Chuc Tran
(74) *Attorney, Agent, or Firm*—Ostrolenk, Faber, Gerb & Soffen, LLP

(57) ABSTRACT

A three-way dimming CFL ballast operates at a single high bus voltage while varying switching frequency to control lamp current. The ballast accepts three different light level input switch command positions and an off position to provide three different light output levels. A closed loop current feedback control maintains a precise switching frequency for the ballast to produce accurate light output levels based on the light output switch selection. A reference value is provided to the feedback loop based on the selected light output level to drive the switching frequency at the appropriate value. The ballast circuit provides a sufficient CFL control for three-way dimming as adapted to be used with a standard Edison screw base.

10 Claims, 5 Drawing Sheets

Regulated Lamp Current Control System

U.S. PATENT DOCUMENTS

| | | | |
|---|---|---|---|
| 5,982,111 A * | 11/1999 | Moisin | 315/283 |
| 5,994,848 A | 11/1999 | Janczak | 315/224 |
| 6,072,282 A * | 6/2000 | Adamson | 315/276 |
| 6,072,284 A * | 6/2000 | Lin | 315/307 |
| 6,137,233 A * | 10/2000 | Moisin | 315/209 R |
| 6,140,779 A * | 10/2000 | Kanazawa et al. | 315/291 |
| 6,160,358 A * | 12/2000 | Moisin | 315/291 |
| 6,175,195 B1 * | 1/2001 | Janczak et al. | 315/194 |
| 6,218,788 B1 * | 4/2001 | Chen et al. | 315/225 |
| 6,232,727 B1 * | 5/2001 | Chee et al. | 315/307 |
| 6,339,298 B1 | 1/2002 | Chen | 315/224 |
| 6,362,575 B1 * | 3/2002 | Chang et al. | 315/224 |
| 6,369,526 B1 * | 4/2002 | Pogadaev et al. | 315/307 |
| 6,424,100 B1 | 7/2002 | Kominami et al. | 315/307 |
| 6,949,888 B1 * | 9/2005 | Ribarich | 315/291 |

OTHER PUBLICATIONS

A New Approach to the Design of Compact Fluorescent Lamp Ballasts Supplied from a very Low Input Voltage: Application to Flyback Inverter, E.L. Corominas, et al. CIEP 98.

An Approach for Selecting Switching Devices for CFL Ballasts, Laszlo Laskai et al. 1998 IEEE.

Phase-Controlled Dimmable CCFL with PPFC and Switching Frequency Modulation, Elson K.F. Yau, et al. 2001 IEEE.

Japanese Office Action dated Sep. 30, 2005 (with English translation).

* cited by examiner

THREE-WAY DIMMING CFL BALLAST

RELATED APPLICATION

The present application is based on and claims benefit of United States Provisional Application No. 60/386,344, filed Jun. 5, 2002, entitled 3 WAY DIMMING CFL BALLAST, to which a claim of priority is hereby made.

BACKGROUND OF THE INVENTION

Field of the Invention

The present invention relates generally to three-way dimming lighting applications, and relates more particularly to three-way compact fluorescent lamps (CFL) that are adapted to fit in standard lighting fixtures.

Incandescent bulbs that have three different light levels have been known for a number of years. These incandescent bulbs typically have two filaments, and are accepted in standard bulb screw bases. The threading of the standard screw base is typically referred to as an Edison screw base, as a widely used standard in the United States for residential and commercial lighting applications. A typical three-way bulb has two contacts for the two different filaments, as well as a common neutral contact, as illustrated in FIG. 1. By operating a three-way dimming switch, as illustrated in FIG. 2, the two different filaments with different power ratings can be selectively operated separately or together to produce three different lumen outputs, with different corresponding power usage. The three-way dimming switch has four different positions to obtain three different light levels and an off selection.

Incandescent lights are known to be inefficient in energy consumption and conversion of electricity to light output. One well known solution to overcoming the inefficiency of incandescent bulbs is to replace them with gas discharge lamps, or fluorescent lamps. Gas discharge lamps offer a much higher efficiency and consume less power to produce relative similar levels of light output. In recent years, compact fluorescent lamps (CFLs) have been produced to fit standard Edison screw bases to replace incandescent bulbs. The CFLs are fluorescent lamps with a self-contained ballast that have an electrical connector and insertion mechanism that emulates the standard Edison screw base. CFL's have also been produced to emulate a three-way dimming incandescent bulb.

Several CFL three-way dimming solutions are available, in which the ballast is specially dedicated to preserving high efficiency with appropriate dimming control. One approach in a ballast design to achieve a three-way dimming CFL is to obtain a full wave rectified line voltage input, which is operated in conjunction with a voltage doubler circuit. This type of ballast design permits two DC bus voltages and two different operating frequencies. Typically, a low frequency operation (40 to 45 kHz) is employed to increase lamp current, while a higher frequency (e.g. 70–75 kHz) results in a lower lamp current. To achieve three-way dimming, the following combinations of bus voltage and frequency operation are employed:

1. Low DC bus (150V)/high frequency minimum output
2. High DC bus (300V)/high frequency medium output
3. High DC bus (300V)/low frequency maximum output This ballast design solution has a number of drawbacks in practical application. For example, the design demands that 100% lamplight output is obtained when the bus voltage is approximately 300V and the frequency is approximately 40 kHz. This high end of the operational range for the ballast design detracts from the ability of the lamp to obtain satisfactory preheat and ignition operation at the lower end of the bus voltage range of approximately 150V. That is, to achieve the high end of operation, it is difficult to configure the circuit so that it also operates properly at the low end range of operation. This limitation in range of operation is due to the practical constraints on the peak voltage that the output circuit is able to produce with a 150V peak-to-peak half bridge voltage.

One solution to overcome the drawbacks in preheat and ignition operation is to omit the preheating phase and to steer the oscillator frequency to resonance during ignition, using feedback from the output circuit. By obtaining resonant operation with feedback from the output circuit, the highest possible ignition voltage is obtained to be applied to the lamp at switch on time, to insure that the lamp will ignite in whichever position the three-way switch is set.

However, without any preheating phase, the life of the fluorescent lamp is substantially reduced because of the increased stress on the lamp cathodes at the point of ignition. In addition, if the DC bus is set to 300V, and the preheating phase is bypassed, the increased ignition voltage on the lamp produces a consequent peak current in the ballast MOSFET half bridge during ignition. Accordingly, the expected lifetime of the MOSFET half bridge ballast is decreased.

If the DC bus voltage is set to 150V at switch on time, ignition of the lamp is more challenging. For example, the operating ballast at resonant frequency with the lower DC bus voltage does not always produce sufficient ignition voltage. If the ballast is maintained at resonant frequency with the lower bus voltage, the ballast will operate in open circuit runmode, producing hard switching in the ballast MOSFET half bridge. It is possible to generate the needed ignition voltage by operating the ballast at resonant frequency for an extended period of time, however the resultant hard switching can have a destructive influence on the ballast. The passive components, including the output inductor and capacitor are sized to produce 100% lamp power at 300V DC bus when the frequency is approximately 40 to 50 kHz. Accordingly, operating the ballast at resonant frequency at a lower bus voltage indicates the need to operate at resonant frequency for an extended period of time to generate the appropriate ignition voltage with the components sized for low frequency and high bus voltage operation ranges. The resulting hard switching in the MOSFETs of the half bridge of the ballast leads to high peak currents, undesirable switching losses and thermal destruction.

The above drawbacks can be overcome by operating the ballast to maintain the DC bus at a single high voltage. With the high voltage fixed DC bus, dimming set points can be achieved simply by changing the frequency at which the ballast operates. For example, the graph in FIG. 3 illustrates the reduction in lamp current as the ballast frequency increases. FIG. 3 also illustrates the sharp non-linearity relationship between lamp current and ballast frequency. If a dimming set point level of 50% of maximum brightness or power output is desired, the set point occurs approximately near the frequency at which the lamp current begins to sharply decline. Accordingly, a small change in frequency results in a very large change in lamp current. The ballast frequency must be very precisely set to obtain an accurate 50% output. Such a precise setting is not viable in practice, since the tolerances of the circuit components do not permit a precision configuration in every case. For example, the variations in the tolerances of the passive components, including the output inductor and capacitor, and the oscillator timing components produce variations that make precise calibration of the ballast frequency for a 50% output difficult. Indeed, even if each ballast circuit is individually adjusted to account for variations in component tolerances, operating environment conditions would still lead to problematic issues. For example, with an individually adjusted ballast that is operated over a range of temperature, as is commonly the case, various environmental conditions can lead to extinguishing the lamp arc. In such a situation, the light system would remain in permanent preheat, which would eventually burn out the cathodes of the lamp. One way to overcome this difficulty is to operate the DC bus at two different voltages, as explained above. However, this solution has the attendant drawbacks discussed previously.

SUMMARY OF THE INVENTION

In accordance with the present invention, the drawbacks of the prior art three-way dimming ballasts are overcome with a MOSFET half bridge ballast that operates at a fixed DC bus voltage of 300V. Circuit operation parameters and passive components are appropriately selected to achieve soft switching in the MOSFET half bridge in all modes of operation.

Tolerance issues with regard to the circuit components can be overcome to achieve precise dimming operation according to the present invention through the introduction of a closed loop feedback system to control lamp current. The feedback circuit senses lamp current and compares the current value with a reference. The result of the comparison is provided to an error amplifier, that is used to drive a voltage controlled oscillator (VCO). The VCO output adjusts the ballast frequency to thereby control the lamp current and obtain a desired level of dimming. This closed loop feedback system provides good precision and controllability of the lamp output, even down to levels of 10% output with very good stability. The feedback loop stabilizes the circuit with regard to operation settings, so that component tolerances are compensated without any deterioration of overall ballast performance.

BRIEF DESCRIPTION OF THE DRAWINGS

The present invention is described in further detail below, with reference to the accompanying drawings, in which.

DETAILED DESCRIPTION OF THE PREFERRED EMBODIMENTS

Figure 4:
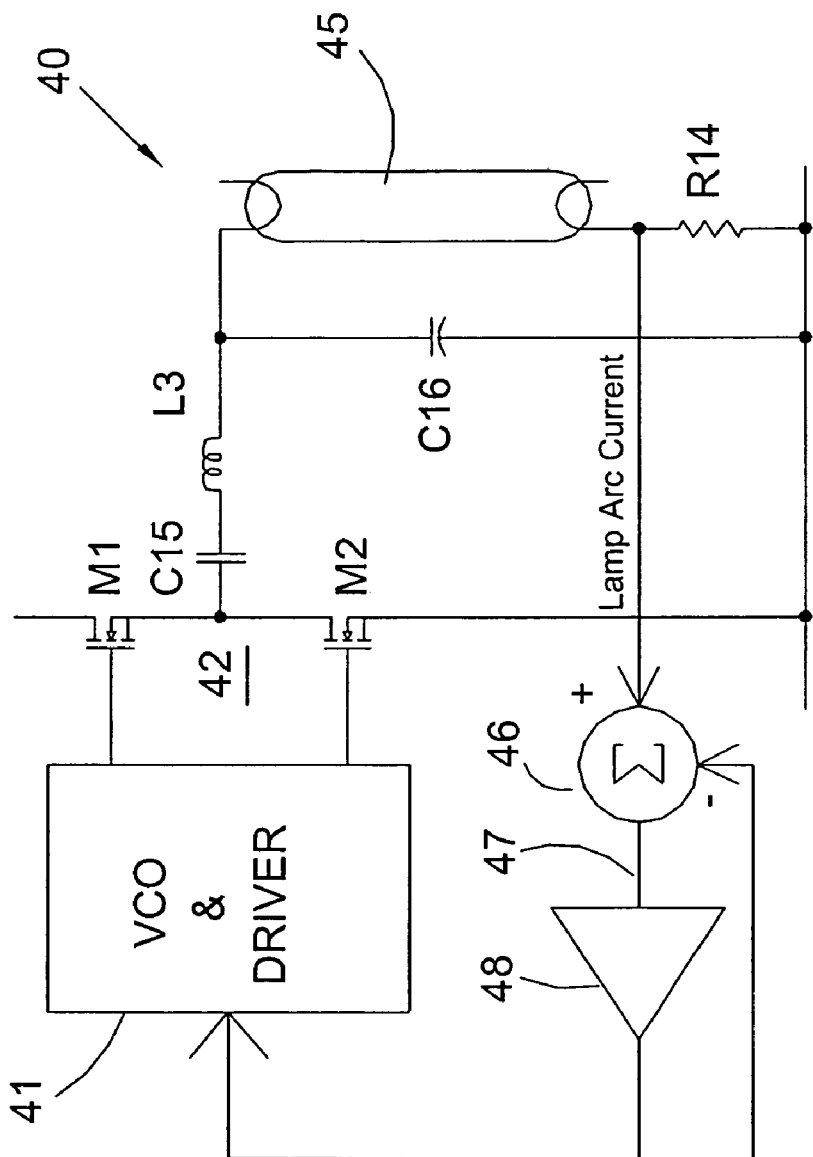
FIG. 4 is a circuit diagram illustrating a feedback control loop according to the present invention.

Referring now to FIG. 4, a closed loop feedback control circuit diagram for a lamp ballast control according to the present invention is shown generally as circuit 40. Circuit 40 includes a voltage controlled oscillator (VCO) and half bridge driver 41. Driver 41 produces gate signals to operate MOSFETs M1 and M2 in half bridge 42. The midpoint of half bridge 42 is connected to lamp 45 through the resonant circuit consisting of L3, C15 and C16. Half bridge 42 is operated to control the lamp current for desired operation of lamp 45. Lamp are current is measured at a low side of lamp 45, and supplied to a summing junction 46. The summing junction subtracts a reference value related to desired lamp output to produce an error signal 47. Error signal 47 represents a difference between the reference value and the measured lamp are current. Error signal 47 is supplied to an amplifier 48 to increase the sensitivity of driver 41 to current loop error feedback. The amplified error signal is used to modulate the control supplied by driver 41 and consequently operate half bridge 42 to reduce a magnitude of error signal 47.

The closed loop feedback system illustrated in circuit 40 controls the lamp current by adjusting the ballast frequency with a VCO in driver 41. The VCO is driven by the output of error amplifier 48, derived from the sensed lamp arc current and the reference value.

Figure 1:
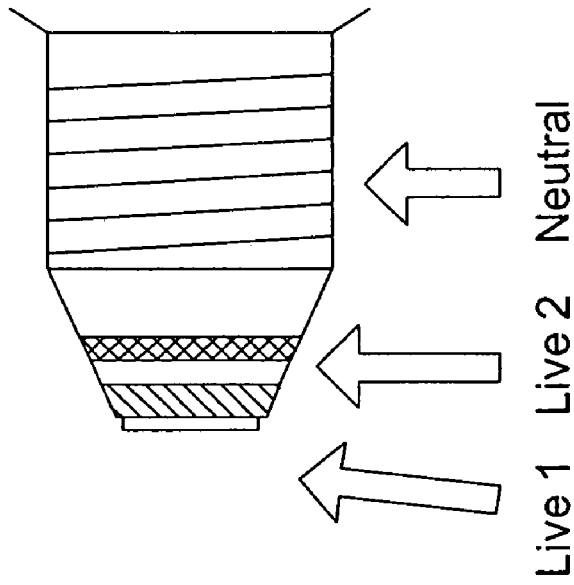
FIG. 1 is an illustration of a standard Edison screw base and a three-way dimming Edison screw base.
Figure 1:
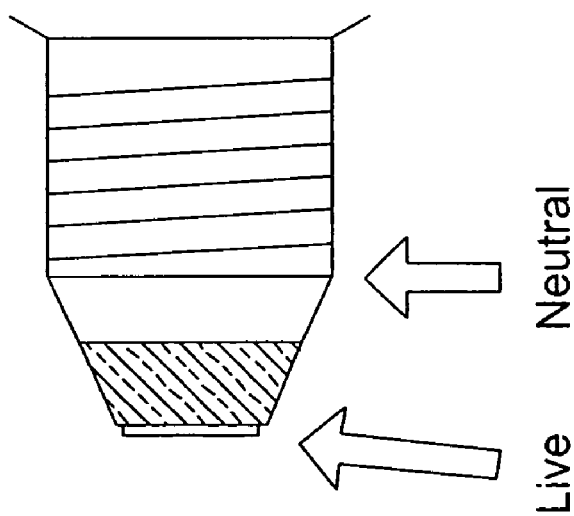
Figure 2:
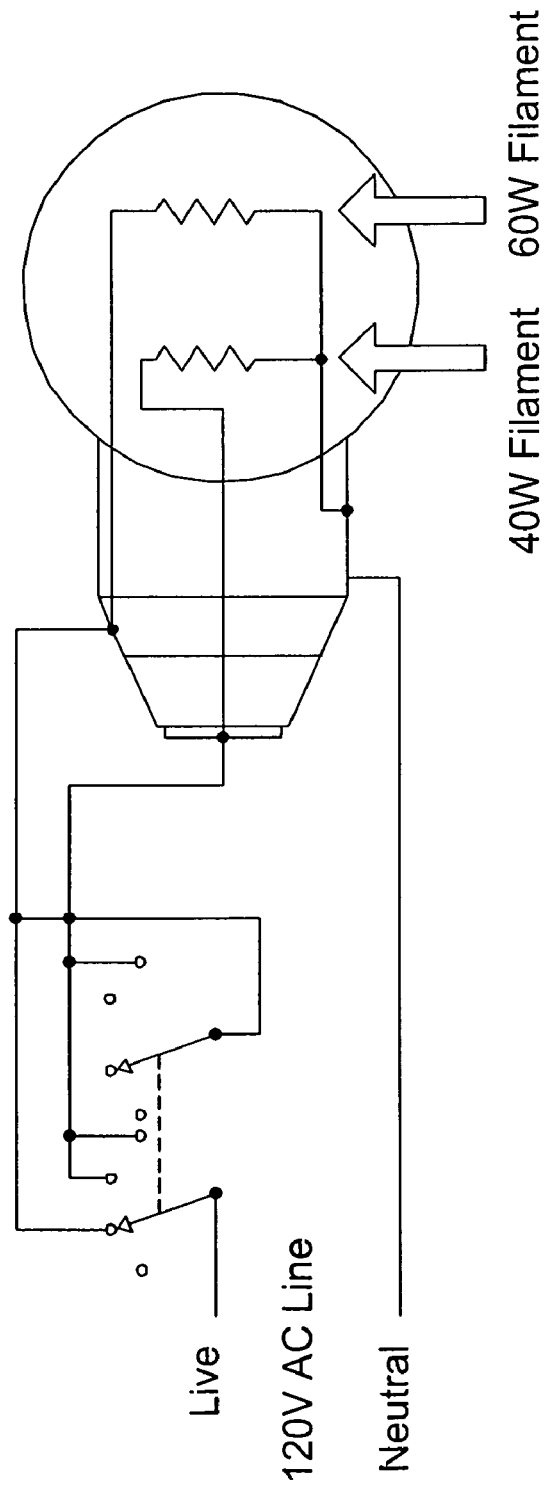
FIG. 2 is a circuit diagram showing the connection of a conventional three-way dimming bulb.
Figure 3:
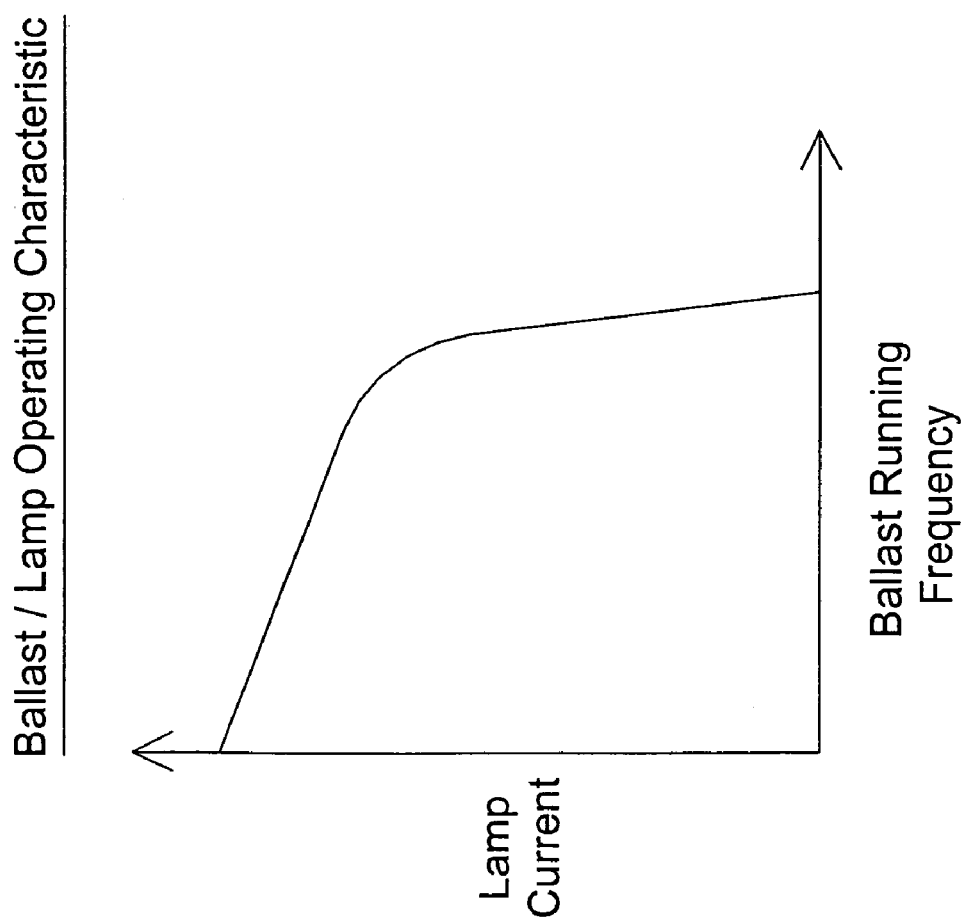
FIG. 3 is a graph plotting lamp current versus ballast frequency.
Figure 5:
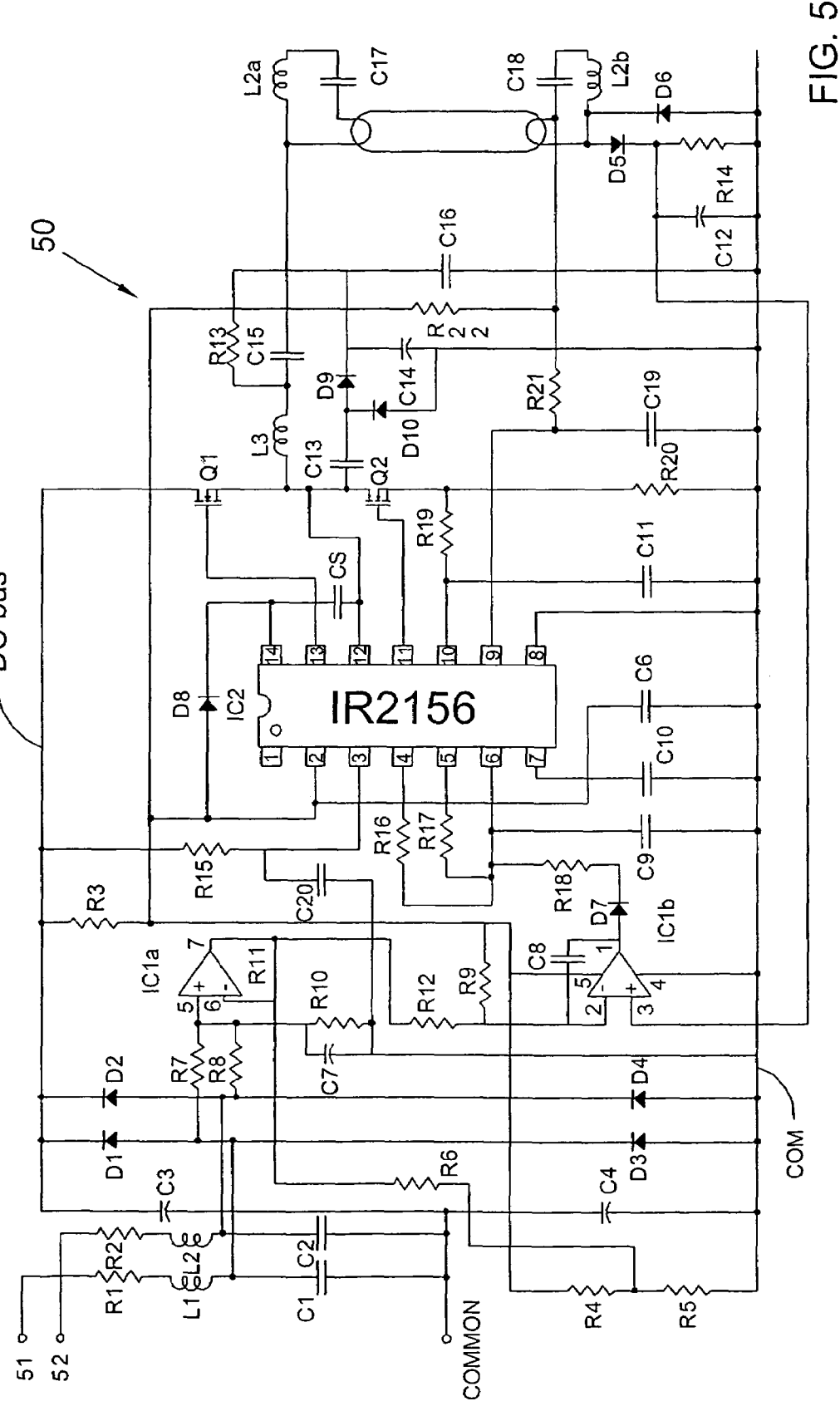
FIG. 5 is a overall circuit diagram of a complete three-way dimming lighting system according to the present invention.

Referring now to FIG. 5, a circuit schematic for an exemplary three-way dimming CFL ballast according to the present invention is illustrated generally as circuit 50. In circuit 50, inputs 51 and 52 represent the two different switched inputs provided by the standard three-way dimming switch. The COMMON input represents the neutral line referred to in FIG. 2. The COMMON or neutral line input also provides a common connection for DC bus storage capacitors C3 and C4. Inputs 51 and 52 are connected to two completely separate voltage doubler diode pairs composed of diodes D1–D4, which are in turn connected to the DC bus. In providing the two separate voltage doubler pairs, it is possible to arrange diodes D1–D4 as an integrated bridge rectifier, or as four individual diodes, even though circuit 50 does not necessarily act as a full wave rectifier in providing the DC bus power.

For the sake of this discussion, the input supplied to 51 or 52 is assumed to be a 60 Hz sinusoidal AC voltage that is available in standard residential and commercial power and lighting applications. However, it should be apparent that the present invention is equally applicable to any type of input power configuration that is available based on any type of international standard. Accordingly, the present invention can be used in a number of different settings in which there are wide variations in input frequency and voltage or current levels.

Through the use of a standard three-way switch configuration, when line input 51 alone is connected to input voltage, a 60 Hz sinusoid or AC voltage is applied between the anode of diode D1 and the cathode of diode D3. The applied voltage varies between the 300V DC bus voltage and the 0V COM point of circuit 50. When input 51 is not connected to input voltage, no voltage is present between the anode of diode D1 and the cathode of diode D3, and the circuit section is floating with respect to any voltage reference. Similarly, when input 52 is connected to input voltage, a 60 Hz sinusoid or AC voltage is applied between the anode of diode D2 and the cathode of D4.

The voltage applied between the two sets of diodes is respectively applied through resistors R7 and R8 and input into op-amp IC1A as the dimming feedback loop reference level. The parallel combination of capacitor C7 and resistor R10 diminishes any ripple voltage applied to the input of IC1A. That is, the value of capacitor C7 is set high enough to ensure that the amount of ripple present on the input of IC1A is negligible. Accordingly, the reference input level is effectively made to be a DC voltage.

With the configuration of diodes D1–D4 connected to inputs 51 and 52, and the connection of resistors R7 and R8, the reference voltage applied to the input of IC1A will change dependent upon whether input 51 alone is connected, input 52 alone is connected, or when both are connected to input power. The values of resistors R7 and R8 are chosen so that the reference voltage level is substantially different if either input 51 or input 52 is connected alone. When input 51 and 52 are connected to input power, the voltage reference level on the input to IC1A is the sum of voltages otherwise produced by each individual input 51 or 52 being connected alone.

For example, the value of resistor R7 can be chosen to provide an appropriate reference voltage level to obtain a 50% light output in reference to lumen power perceived by the human eye. Typically, a desired 50% light output occurs at a point somewhat lower than the 50% ballast power output point. Similarly, the value for resistor R8 can be chosen to achieve a light output of 75%, which corresponds to about 50% of the nominal total ballast power obtained at full light output. By setting these values appropriately, the three-way dimming circuit can achieve the first two light levels as desired when either of inputs 51 or 52 are connected to input power.

However, when both inputs 51 and 52 are connected to input power, the resulting summed reference voltage level is not high enough to produce a 100% light output, since the ballast circuit 50 will be operated at a somewhat less than 100% power level. Accordingly, the present invention offers an additional feature to obtain 100% power output with a corresponding 100% light output by providing an additional reference voltage level on an input to op-amp IC1A, which also receives the reference voltage level for desired percentage light output.

Circuit 50 illustrates a reference voltage applied to pin 6 of op-amp IC1A that is set to a particular value for two purposes. First, the reference voltage is set to have a value that is greater than the reference voltage produced on pin 5 when any single input 51, 52 is connected to input power. Second, the reference voltage level is set to be less than the reference voltage value at pin 5 when both inputs 51, 52 are connected to input power. Op-amp IC1A is configured as a non-inverting DC amplifier with a fixed gain. According, the output of IC1A produces a higher voltage level when both inputs 51, 52 are connected to input power, and a lower voltage level when only one input 51, 52 is connected to input power. With this configuration, the values for the resistors R4, R5, R6 and R11 may be selected to achieve any particular percentage power output desired to obtain the desired corresponding percentage light output, based on the state of inputs 51, 52. That is, the additional reference voltage connected to pin 6 of op-amp IC1A is derived from a connection obtained between resistor R6 and resistor R11. Furthermore, the voltage supplied through R6 is derived from the connection obtained between resistor R4 and R5. Setting the resistor values appropriately provides the desired reference level values.

A sensed value related to lamp are current is fed back to op-amp IC1B to determine an error value level to supply to the VCO and driver inputs of IC2. Lamp arc current is sensed by measuring the voltage across R14, and supplying the same to op-amp input 3 of IC1B. Op-amp IC1B receives the output of op-amp IC1A as a voltage reference value to produce the error value level output for controlling the VCO and driver circuits.

Because current through the lamp is measured with a resistor, it is possible that erroneous current measurements can occur when the ballast is in preheat mode. That is, when there is no current through the lamp, but the resonant circuit is activated to preheat the cathodes of the lamp, a voltage can develop across resistor R14. Erroneous readings across resistor R14 during preheating are avoided by preheating the cathodes of the lamp in a voltage mode, and thus the current in the resonant capacitor C16 does not impact current measurements taken across resistor R14. Accordingly, the lamp are current will always be zero during preheating and prior to ignition. This configuration provides the advantage that the feedback circuit does not influence the oscillator frequency used during preheating. It is only after the lamp has ignited and the current is obtained through the lamp that the current sense feedback circuit can influence the VCO and driver circuits. The value of resistor R17 is set to determine the preheat parameters, and is not influenced or dependent upon the connection of inputs 51, 52 with input power. Accordingly, regardless the input states in the ballast circuit, preheat and ignition operations are conducted properly due to the higher bus voltage and the lack of current running through the lamp during preheating. This configuration achieves optimum preheating and ignition under all conditions without having to compensate for a variable frequency or bus voltages, while accommodating the tolerances of the components used.

Circuit 50 includes various protections to determine when fault conditions occur, and to take appropriate action. For example, in a typical fluorescent lighting application, it is possible that the lamp will be removed while powered, resulting in possible damage to the ballast circuit. The condition in which the lower cathode is an open circuit can also be accommodated for a fault protection. However, in CFL applications, in which the ballast and the lamp are typically integrated into a single package, these protections are not a useful to the application. Accordingly, resistors R21 and R22 and capacitor C19 can be omitted, and the shut down signal SD on pin 9 of IC2 can be connected directly to COM.

Circuit 50 also provides protections against short circuits and low voltages, and can shut down the half bridge comprised of transistors Q1 and Q2 to protect ballast circuit 50. These features, typically provided in removable lamp applications, can be retained for added protection in CFL applications. However, they are not critical to the application, and can be omitted by removing resistors R19 and R20, and capacitor C11 and tying the current sense signal on pin 10 of IC2 directly to COM.

Often in fluorescent lamp dimming applications, striations or dark rings in the lamp may occur at low dimming levels. Circuit 50 overcomes this drawback by providing resistor R13 in the resonant circuit to improve the low level dimming performance. In addition, circuit 50 illustrates resistors R1 and R2, inductors L1 and L2, and capacitors C1 and C2 on the input lines L1, L2. However, these components are all optional, as R1 and R2 provide input protection as fusible resistors, while L1, L2, C1 and C2 are configured to provide an EMI filtering circuit. Accordingly, while preferred operation of circuit 50 includes these components, they are not necessary for operation of the CFL ballast.

When the lamp absence protection circuit is present, an absent lamp causes a voltage of approximately 5.1V to be applied to the SD input on pin 9 of IC2. This voltage is supplied through resistors R21 and R22 to charge capacitor C19. If a lamp is present in the circuit, the voltage at the junction of resistors R21 and R22 is held low through diode D5 and resistor R14. The current sense resistor R20 is selected so that a lack of current through the lamp, or ignition failure when the ballast frequency approaches the resonant frequency of the ballast circuit, causes a shutdown to prevent operation of transistors Q1 and Q2 to provide for their protection.

Low DC bus voltage protection is provided through connections to the VDC input on pin 3 of IC2. Resistor R15 and capacitor C20 are connected from the DC bus to COM to remove noise, and to increase the switching frequency of the half bridge to make sure that frequency is maintained above the resonance frequency. By keeping the switching frequency above that of the resonance frequency, even in a brownout situation, hard switching will not occur. This additional circuitry on input VDC avoids a shutdown of the ballast circuit upon any impending hard switching that may occur. That is, when the current sense protection circuit is implemented on input CS on pin 10 of IC2, a brownout causing the DC bus to briefly fall can result in hard switching, which causes the ballast half bridge to shut down and remain off line until power is cycled. This mode of operation is undesirable, even though the half bridge is protected from hard switching. Accordingly, the circuit arrangement coupled to the input of VDC avoids a shutdown in the event the DC bus voltage falls for a brief period of time.

The layout of circuit 50 is an important issue due to the use of the closed loop feedback control system. All 0V or common returns should be joined to a common point and have as short a run as possible for the common point of capacitor C4 and pin 8 of IC2. Capacitor C6 should also be located as close to IC2 as possible to have short tracks between the components. By observing these precautions, ground loop problems can be avoided. The connection track from capacitor C5 to the MOSFET half bridge should also be kept as short as possible, and as far from the error amplifier as possible to avoid interference. Capacitor C14 should be close to IC1 and IC2 with short tracks to the positive supply pins to provide maximum decoupling. All the tracks carrying high frequency currents in the output section should be distanced from IC1 and IC2 to avoid interference.

By properly selecting the output capacitor and inductor values, the losses in the inductor can be minimized. That is, the resonant circuit should be arranged so that the maximum brightness of the lamp output can occur at a frequency of around 40–45 kHz. For example, in a 25W spiral CFL lamp, the value of L3 is selected to preferably be 2.2 mH and capacitor C16 is set to a value of about 4.7 nF. Using these component values, the values of the other various components including resistors R16 and R17, and capacitor C9, are calculated to obtain a preheat frequency of 65 kHz, a run frequency of 40 kHz and an ignition frequency of around 59 kHz.

Output inductor L3 is designed to withstand high peak ignition current without saturating to avoid a shutdown initiated by IC2. The ignition current is dependent upon the type of lamp, and can be adjusted by providing appropriate preheat settings. Losses in the inductor L3 can be reduced by constructing inductor L3 of multi-stranded wire in conjunction with the use of ferrite cores of sufficiently good quality. Preferably, inductor L3 is constructed with as many turns as possible of multi-stranded wire wound around the core with the largest gap possible to achieve the desired inductance value. By constructing L3 according to this procedure, available peak current through inductor L3 is maximized without saturation of the inductor. It should be noted that a hot inductor core leads to reduced peak current and saturation point for the inductor. Accordingly, when a lamp is reignited in a hot state, ballast shutdown is possible due to the reduced saturation point of the inductor and the high peak ignition current when the inductor is improperly or poorly constructed. Preferably, for inductor cores according to the present invention, the core size is fit to EF20.

Lamp life can be prolonged by sufficiently preheating the cathodes of the lamp prior to ignition, with the proper preheat current. As noted above, the preheat current has a direct impact on the ignition current and the component sizing for the ballast circuit 50. The preheat time can be set by adjusting the value of capacitor C10, which will charge up to a specified value during preheat operation. Typically, the lamp filament will glow red during preheat and prior to ignition. If preheat is insufficient for the cathodes of the lamp, the ballast is more likely to shut down during ignition because the output inductor will saturate and be unable to operate at the high current required for ignition. Sufficient preheat can be obtained by providing an appropriate number of turns in the auxiliary cathode windings of the output inductors L2a and L2b Preferably, inductor L2 is wound on a common core with L3. In the case of CFL circuits, the SD input on pin 9 of IC2 can be coupled to COM so that the inductor can saturate without shutting down the ballast circuit for overcurrent protection.

The resistance values of the cathode for the lamp filament varies over temperature, and thus varies over the range of dimming levels. Preferably, the lamp filament resistance is set to be between 3 and 5.5 times the resistance measured when cold. Hot resistance can be determined by connecting one cathode to a DC power supply and slowly increasing the voltage supplied to the cathode until the cathode glows red. No further voltage increases should be applied in this test because of possible cathode damage. At this point, the resistance of a cathode can be calculated by measuring the current supplied to the cathode for the voltage obtained.

A range of operation for the cathode voltage can be set by choosing the values of capacitors C17 and C18. An exemplary method for determining an appropriate range of operation is to connect a true RMS volt meter across a cathode and then observe the measured voltage and maximum and minimum brightness. The maximum cathode voltage is obtained at the minimum dimming setting for the ballast. By setting values of capacitors C17 and C18, the voltage increase at minimum brightness can be controlled, e.g., by reducing the capacitance, the amount by which the cathode voltage rises is correspondingly reduced. The values of capacitors C17 and C18 are chosen to prevent the cathode voltage from exceeding an upper limit with a minimum brightness output. It should be noted that when additional windings on an inductor are used to provide the cathode preheating means, the power transferred through the inductor flows through the inductor core. Consequently, the inductor core loss increases, as does the core operating temperature. The inductor core reaches its highest operating temperature when the ballast is running at minimum brightness. As noted above, the peak current and saturation point for the inductor will be lowered with increases in core operating temperature.

An exemplary selection of component values is provided below in Table 1 for a 25W spiral CFL. While these component values are selected to achieve good operating characteristics for the CFL, it should be noted that the ballast can be optimized for a particular lamp used with the ballast.

TABLE 1

| REFERENCE | DESCRIPTION |
| --- | --- |
| L1, L2 | Filter Inductor |
| L3 | Inductor 2.2 mH EF20 |
| C1, 2 | 100 nF 200 V |
| C3, 4 | 22 uF 200 V 105 C Electrolytic |
| C7 | 22 uF 35 V 105 C Electrolytic |
| C8, 20 | 10 nF 50 V 1206 |
| C9 | 680 pF 50 V NPO 1206 |
| C10 | 0.33 uF 25 V 1206 |
| C11 | 470 pF 50 V 1206 |
| C5, 6, 19 | 100 nF 50 V 1206 |
| C17, 18 | 220 nF 100 V 1206 |
| C13 | 1 nF 1 kV Ceramic |
| C14 | 2.2 uF 25 V 105 C Electrolytic |
| C15 | 47 nF 400 V |
| C16 | 4.7 nF 1 kV Polypropylene |
| C12 | 0.47 uF 10 V Tantalum Bead |
| R1, 2 | 5.6 R 1 W Axial |
| R7, 15 | 1M.0.5 W Axial |

TABLE 1-continued

| REFERENCE | DESCRIPTION |
|---|---|
| R3 | 220K 0.5 W Axial |
| R8 | 680K 0.5 W Axial |
| R4 | 68K 1206 |
| R5 | 3K3 1206 |
| R21 | 100K 0.25 W Axial |
| R6, 11 | 100K 1206 |
| R10 | 3K3 12–6 |
| R12, 18 | 10K 1206 |
| R9 | 1M 1206 |
| R16, 17 | 33K 1206 |
| R19 | 1K 1206 |
| R20 | 0.5 R 0.25 W Axial |
| R14 | 22 R 1206 |

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A ballast circuit for a CFL, comprising:
a current sense device coupled to the lamp and operable to provide an indication of current through the lamp;
a current sense feedback circuit coupled to the current sense device and a reference value for producing a signal related to a difference between the indication from the current sense device and the reference value;
a half bridge driver coupled to a half bridge for operating the lamp, the signal being coupled to the half bridge driver; and
a voltage controlled oscillator coupled to the half bridge driver and responsive to the signal to modify operation of the half bridge to drive the signal to a specified value, wherein the driver has a mode of operation for voltage lamp preheating, such that no current is indicated by the current sense device during preheat operation.

2. A three-way dimming ballast circuit for a CFL, comprising:
a ballast input for selecting a desired light output level from the lamp, the lamp including a plurality of light output levels each having a corresponding reference value;
a DC bus for supplying DC power to the ballast circuit and coupled to the ballast input;
a variable frequency oscillator operable to provide a switching frequency for the ballast circuit to control a lamp arc current level in conjunction with power supplied by the DC bus based on the ballast input; and
a closed loop feedback control circuit coupled to the lamp and the oscillator and operable to sense lamp arc current and, when the lamp arc current is non-zero, to modify the switching frequency provided by the oscillator in relation to a reference value corresponding to the desired light output level.

3. The ballast circuit according to claim 2, wherein the reference value is determined by the ballast input to correspond to the selected light output level.

4. The circuit according to claim 2, wherein the closed loop feedback control further comprises:
a current sense device coupled to the lamp and operable to provide a current sense output related to lamp arc current;
a comparison device coupled to the current sense device and to the reference value, the comparison device operable to provide a signal based on a difference between the current sense output and the reference value; and
the signal being coupled to the oscillator to control the oscillator frequency to drive the signal to a predetermined value.

5. The circuit according to claim 2, further comprising a voltage doubler on an input of the ballast circuit.

6. A three-way dimming CFL, comprising:
a ballast circuit coupled to a lamp with a high voltage DC bus and a variable frequency output, the ballast circuit being responsive to a user selected input representing a desired light output level selected from a plurality of light output levels each having a corresponding reference value, to vary the frequency output to change a lamp arc current; and
a feedback circuit coupled to the lamp and operable, when the lamp arc current is non-zero, to vary the frequency output to obtain a desired lamp arc current based on a reference value corresponding to the user selected input.

7. A method for controlling a CFL output with a switching ballast, the method comprising the steps of:
providing a ballast selection input for selecting one of a plurality of light output levels each having a corresponding reference value;
producing a ballast switching frequency for operating the lamp at the selected light output level; and
when a lamp arc current is non-zero, adjusting the switching frequency based on lamp arc current measurement and a reference value to drive the measurement to the reference value corresponding to the selected light output level.

8. A method for controlling a CFL output with a switching ballast, the method comprising the steps of:
producing a ballast switching frequency for operating the lamp at one of a plurality of light output levels each having a corresponding reference value; and
adjusting the ballast switching frequency based on a lamp arc current measurement and a reference value corresponding to the light output level of the produced ballast switching frequency, by driving the lamp arc current measurement to the reference value, wherein the step of adjusting the ballast switching frequency comprises the steps of:
obtaining the lamp arc current measurement;
comparing the lamp arc current measurement to the reference value; and
when the lamp arc current is non-zero, modifying the ballast switching frequency based on a result of the comparison.

9. The method according to claim 8, further comprising the step of deriving the reference value based on an indication of desired light output level.

10. The method according to claim 8, further comprising the step of preheating a cathode of the lamp in a voltage mode, to thereby avoid producing the lamp arc current measurement.

* * * * *